(12) United States Patent
Tsuchiya et al.

(10) Patent No.: US 11,569,614 B2
(45) Date of Patent: Jan. 31, 2023

(54) FLOATING STRUCTURE OF COAXIAL CONNECTOR

(71) Applicant: SMK Corporation, Tokyo (JP)

(72) Inventors: Hirotaka Tsuchiya, Tokyo (JP); Fumio Osawa, Tokyo (JP); Tadahito Sasaki, Kanagawa (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 17/356,596

(22) Filed: Jun. 24, 2021

(65) Prior Publication Data

US 2022/0115813 A1 Apr. 14, 2022

(30) Foreign Application Priority Data

Oct. 12, 2020 (JP) .............................. JP2020-171901

(51) Int. Cl.
*H01R 13/631* (2006.01)
*H01R 9/05* (2006.01)
*H01R 24/52* (2011.01)
*H01R 103/00* (2006.01)

(52) U.S. Cl.
CPC ........... *H01R 13/6315* (2013.01); *H01R 9/05* (2013.01); *H01R 24/52* (2013.01); *H01R 2103/00* (2013.01)

(58) Field of Classification Search
CPC .... H01R 12/772; H01R 13/6315; H01R 9/05; H01R 9/0515; H01R 24/50; H01R 24/52
USPC ................. 439/246–248, 449, 452
See application file for complete search history.

(56) References Cited

U.S. PATENT DOCUMENTS

| 4,580,862 A | * | 4/1986 | Johnson | H01R 24/52 439/585 |
| 4,697,859 A | * | 10/1987 | Fisher, Jr. | H01R 13/6315 439/246 |
| 5,167,520 A | * | 12/1992 | Henry | H01R 13/6315 439/376 |
| 5,448,026 A | * | 9/1995 | Ozeki | H01H 3/122 200/341 |

(Continued)

FOREIGN PATENT DOCUMENTS

| CN | 113497392 A | * 10/2021 | ........... H01R 13/432 |
| JP | 2002083655 A | 3/2002 | |

(Continued)

OTHER PUBLICATIONS

Extended European Search Report for European Patent Application No. 21182609.4, issued by the European Patent Office dated Dec. 17, 2021.

*Primary Examiner* — Marcus E Harcum

(57) ABSTRACT

Provided is a floating structure of a coaxial connector having a floating function and ensuring a reliable connection and water cutoff property are ensured. The floating structure of the coaxial connector includes: a plug introduction hole having an inner diameter larger than an outer diameter of the plug; an enlarged diameter hole communicating with the tip side of the plug introduction hole; a locking ring fixed in the enlarged diameter hole; a slider having a slide ring disposed movably in the axial direction and the axial radial direction; and an energizing elastic member that energizes the slide ring toward the locking ring. The plug body is coupled to the slider, and the plug body is held in the plug insertion part movably in the axial direction and the axial radial direction.

3 Claims, 9 Drawing Sheets

(56) References Cited

U.S. PATENT DOCUMENTS

| | | | |
|---|---|---|---|
| 5,516,303 A | 5/1996 | Yohn | |
| 5,746,617 A * | 5/1998 | Porter, Jr. | H01R 13/6315 439/248 |
| 6,224,407 B1 * | 5/2001 | Duquerroy | H01R 13/6315 439/188 |
| 6,354,855 B2 * | 3/2002 | Annequin | H01R 13/74 439/248 |
| 6,699,054 B1 * | 3/2004 | Critelli | H01R 24/50 439/63 |
| 7,422,456 B1 | 9/2008 | Mitani | |
| 8,822,845 B2 * | 9/2014 | Lamprecht | B25F 5/00 174/650 |
| 9,905,968 B2 * | 2/2018 | Yanase | H01R 13/6315 |
| 10,790,624 B2 * | 9/2020 | Wang | H01R 24/50 |
| 10,892,576 B2 * | 1/2021 | Lu | H01R 13/6315 |
| 11,025,008 B2 * | 6/2021 | Kim | H01R 13/052 |
| 2002/0061670 A1 * | 5/2002 | Havener | H01R 24/50 439/246 |
| 2012/0071020 A1 * | 3/2012 | Wu | H01R 13/6658 439/449 |
| 2013/0065426 A1 * | 3/2013 | Yamashita | H01R 13/6315 439/449 |
| 2014/0051279 A1 * | 2/2014 | Lee | H01R 13/5833 439/449 |
| 2016/0104969 A1 * | 4/2016 | An | H01R 13/6315 439/248 |
| 2021/0399468 A1 * | 12/2021 | Gingrich, III | H01R 13/426 |

FOREIGN PATENT DOCUMENTS

| | | |
|---|---|---|
| JP | 2007087682 A | 4/2007 |
| JP | 2008262736 A | 10/2008 |
| JP | 6712376 B1 | 6/2020 |
| KR | 2533768 A1 * | 3/1984 |
| KR | 20190032154 A | 3/2019 |

* cited by examiner

FLOATING STRUCTURE OF COAXIAL CONNECTOR

CROSS REFERENCE TO RELATED APPLICATION

The contents of the following Japanese patent application are incorporated herein by reference,
Japanese Patent Application NO. 2020-171901 filed on Oct. 12, 2020.

FIELD

The present invention relates to a floating structure of a coaxial connector for connecting an electronic component housed in a case such as a camera module and a cable such as a coaxial cable.

BACKGROUND

In a module such as a camera module for an onboard camera, a module body housed in a case is connected to a coaxial cable via a coaxial connector attached to the case.

This coaxial connector includes a receptacle connected to a substrate constituting the module body housed in the case and a plug connected to the coaxial cable, and by attaching the plug to the case or assembling a rear case with the plug attached to the front case, the plug and the receptacle are connected.

At the time of connection between the plug and the receptacle, when the plug and the receptacle to be connected to each other are displaced in an axial or radial direction depending on the position of the substrate housed in the case, the attachment position of the receptacle to the substrate, or the like, the displacement needs to be corrected, and the connection needs to be performed steadily.

Therefore, there has been used a coaxial connector with a floating mechanism which includes a receptacle body fixed to a module body and a movable connection part movable in the axial radial direction with respect to the receptacle body and in which the movable connection part is connected to a plug (e.g., see Patent Literature 1).

Meanwhile, as the floating structure of the coaxial connector, there is a structure in which a plug is held in a housing such as a case so as to be movable in the axial radial direction (e.g., see Patent Literature 2).

This floating structure of the coaxial connector includes a plug insertion hole into which the plug is inserted into the housing such as the case, and a gap for movement is formed between the plug insertion hole and the plug so that the plug can move in the axial radial direction with respect to the housing.

CITATION LIST

Patent Literature

Patent Literature 1: Japanese Patent Application Laid-Open No. 2008-262736
Patent Literature 2: Japanese Patent Application Laid-Open No. 2002-083655

SUMMARY

Technical Problem

However, in the prior art such as Patent Literature 1 described above, since the receptacle body having the receptacle connected to the substrate or the like and the movable connection part movable in the axial radial direction with respect to the receptacle body are provided separately, the outer shape of the receptacle becomes large accordingly, and it may be difficult to attach the receptacle with the floating mechanism when the space in the case is limited, or the like.

Meanwhile, in the prior art such as Patent Literature 2, with the gap being generated between the plug insertion hole and the plug so as to ensure the floating structure, the gap may become an entry path for water, and there has been a concern that the entry of the water into the housing may cause corrosion and short-circuiting of internal electric circuits and electronic components.

In each prior art described above, since the plug is connected to the receptacle through the housing such as the case, the connection state between the plug and the receptacle cannot be confirmed, and the reliability of the connection of the connector cannot be ensured, which has also been problematic.

Therefore, in view of such conventional problems, the present invention has been made to provide a floating structure of a coaxial connector having a floating function and ensuring a reliable connection and water cutoff property.

The characteristic of a first aspect of the invention for solving the conventional problems as described above is that in a floating structure of a coaxial connector including: a plug having a plug body connected with a flexible coaxial cable; and a receptacle housed in a case, the plug, inserted into a cylindrical plug insertion part formed in the case, and the receptacle being coupled to each other, the plug insertion part includes a plug introduction hole having an inner diameter larger than an outer diameter of the plug, an enlarged diameter hole communicating with a tip side of the plug introduction hole and having a diameter larger than a diameter of the plug introduction hole, a locking ring fixed in the enlarged diameter hole, a slider having a slide ring disposed movably in an axial direction and an axial radial direction between a bottom of the enlarged diameter hole and the locking ring, and an energizing elastic member that energizes the slide ring toward the locking ring, the plug body is coupled to the slider, and the plug body is held in the plug insertion part movably in the axial direction and the axial radial direction.

The characteristic of a second aspect of the invention is that in addition to the configuration of the first aspect, the slider includes a holder part, into which the plug body is inserted, and an engagement spring body that engages with an engagement protrusion projected from an outer periphery of the plug body is provided on a tip side of the holder part.

The characteristic of a third aspect of the invention is that in addition to the configuration of the first or second aspect, the plug includes a cap made of an elastic body that fits outside the coaxial cable and fits into an introduction-side opening of the plug insertion part, and the cap seals the plug insertion part, and the plug body is held on the cap via the coaxial cable.

The characteristic of a fourth aspect of the invention is that in addition to the configuration of the third aspect, a cover body is provided having a top plate part projected outward from the cap and a cylindrical outer peripheral part supported by the top plate part, and the outer peripheral part is formed with an engagement hole that engages with an engagement projection projected from an outer periphery of the plug insertion part.

The floating structure of the coaxial connector according to an aspect of the present invention has the configuration according to the first aspect, so that even when the space in the case is limited, and it is difficult to use the receptacle with the floating mechanism, the displacement between the plug and the receptacle can be absorbed, and the connection therebetween can be performed reliably.

Further, in an aspect of the present invention, with the configuration according to the second aspect provided, a click feeling can be obtained at the time of connection between the plug and the slider, and even when the case is interposed, and the connection state cannot be visually recognized, a reliable connection can be confirmed.

Further, in an aspect of the present invention, with the configuration according to the third aspect provided, the plug can be held on the cover via the floating mechanism, and waterproofness can be ensured.

Further, in an aspect of the present invention, with the configuration according to the fourth aspect provided, the cap can be reliably fixed to the plug insertion part, and high waterproof performance can be maintained.

DESCRIPTION OF EMBODIMENTS

Figure 1:
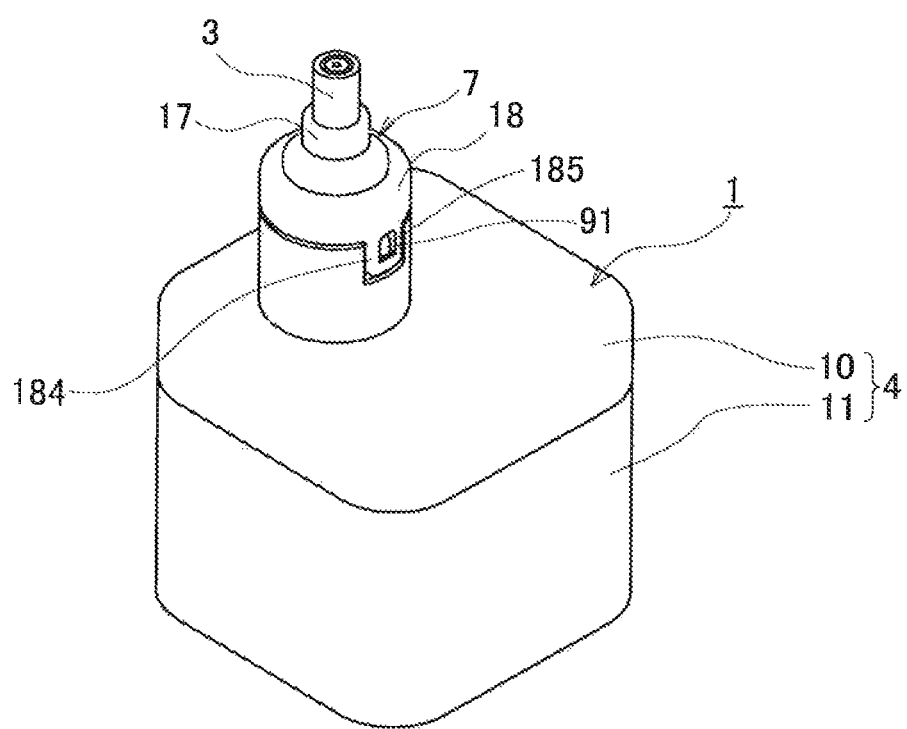
FIG. 1 is a perspective view illustrating an example of a usage form of a floating structure of a coaxial connector according to an aspect of the present invention.

Next, an embodiment of the floating structure of a coaxial connector 4 according to an aspect of the present invention will be described with reference to the embodiments illustrated in FIGS. 1 to 12. In the drawing, reference numeral 1 denotes a module in which a module body is housed in a case 2 such as a camera module.

The module 1 is connected to a substrate 5 constituting a module body in which a flexible coaxial cable 3 is housed in the case 2 via a coaxial connector 4.

Figure 2:
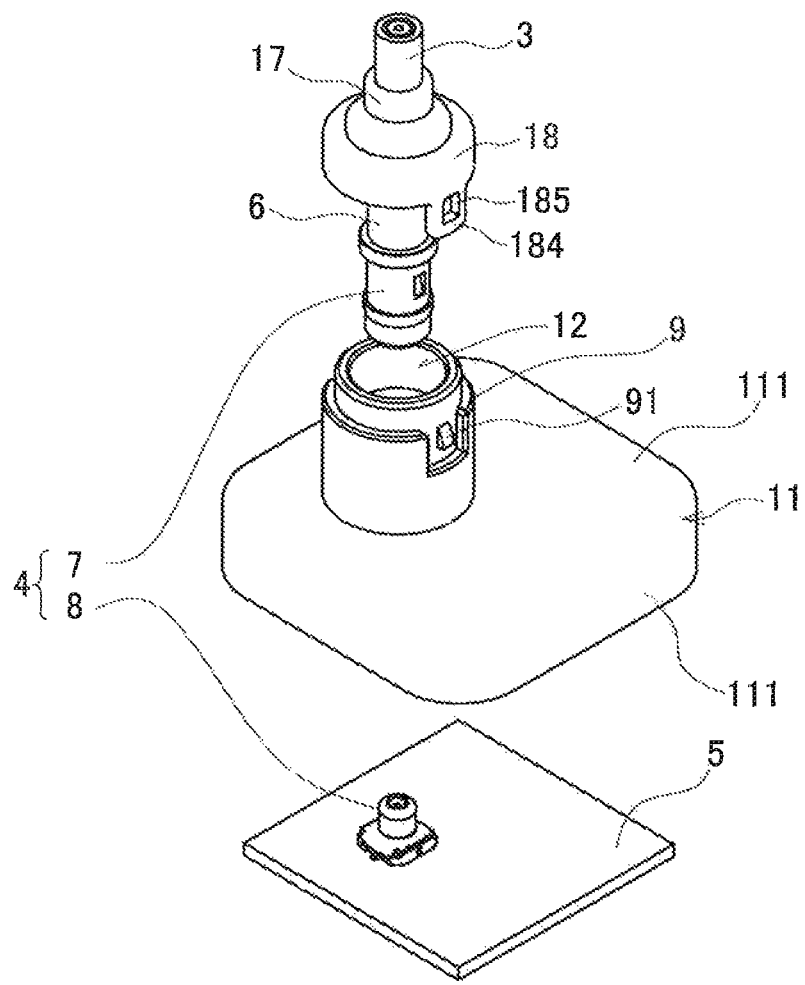
FIG. 2 is an exploded perspective view of the coaxial connector connected via a rear case in the same structure.
Figure 3:
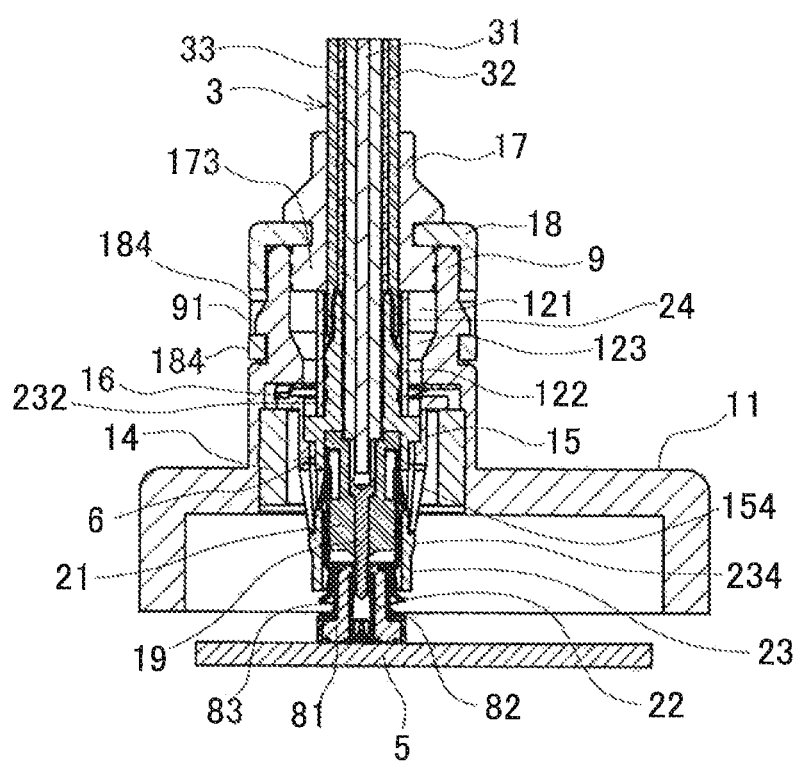
FIG. 3 is a longitudinal sectional view of the same structure.

As illustrated in FIGS. 2 and 3, the coaxial connector 4 includes a plug 7 to which the coaxial cable 3 is connected to a plug body 6 and a receptacle 8 connected to the substrate 5 of the module body housed in the case 2, and the plug 7 and the receptacle 8 are connected to each other by inserting the plug 7 into a cylindrical plug insertion part 9 formed in the case 2.

The coaxial connector 4 includes a floating structure, the plug 7 is held movably in the axial direction and the axial radial direction with respect to the case 2, and even when the position of the receptacle 8 housed in the case 2 is displaced, the displacement is absorbed, and the plug 7 and the receptacle 8 are connected reliably.

The case 2 is formed into a box shape by a combination of a front case 10 and a rear case 11 that were cast using a conductive metal material such as aluminum.

The rear case 11 includes a rectangular cylindrical peripheral wall 111 and a top plate part 112 for closing the upper surface of the peripheral wall 111 and is formed in a top-box shape with an open lower surface, and the cylindrical plug insertion part 9 is integrally projected at a prescribed position of the top plate part 112.

Figure 4:
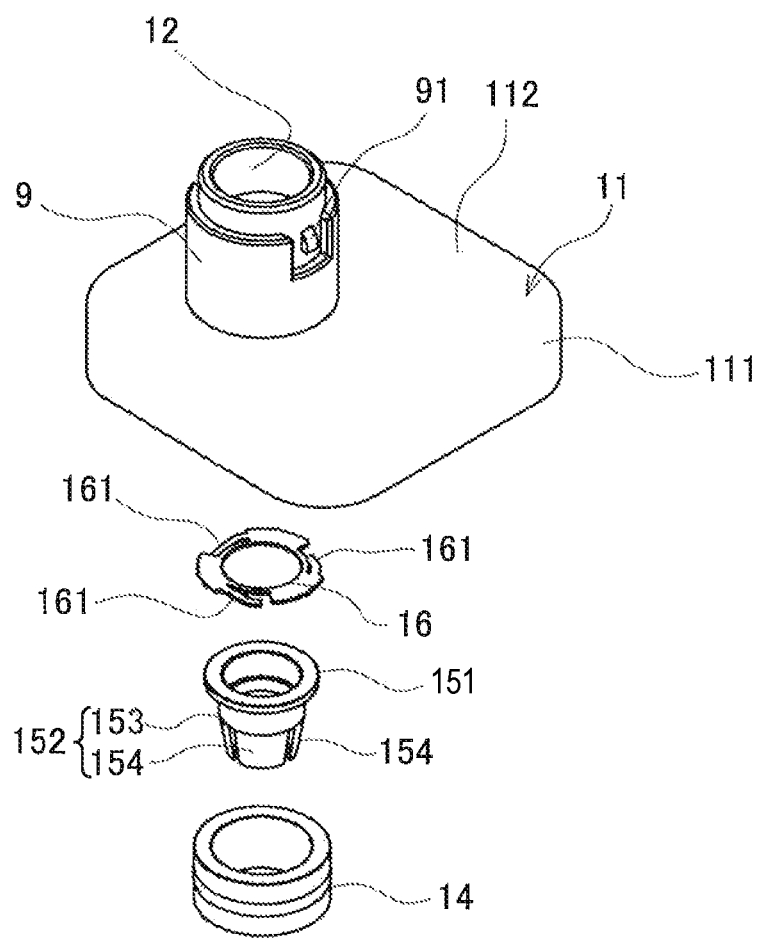
FIG. 4 is an exploded perspective view illustrating the rear case in the same structure.
Figure 5:
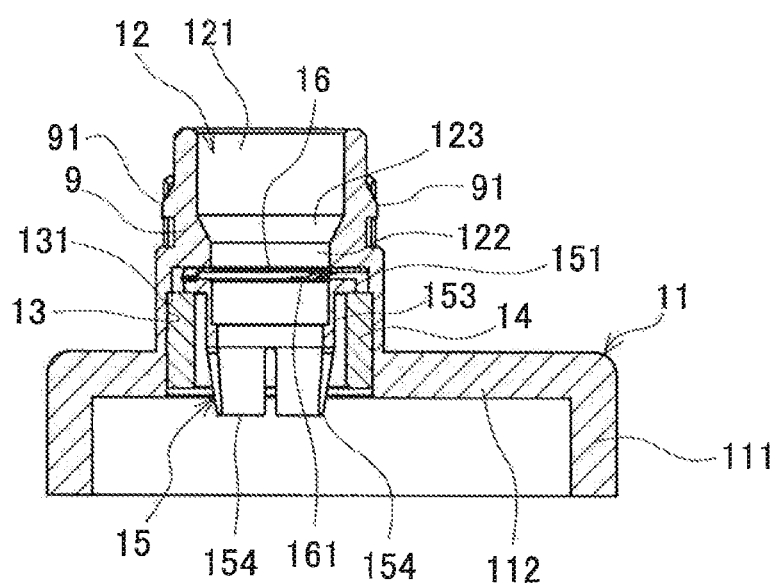
FIG. 5 is a longitudinal sectional view of the same structure.

As illustrated in FIG. 4, the plug insertion part 9 includes a plug introduction hole 12 having an inner diameter larger than the outer diameter of the plug 7, an enlarged diameter hole 13 communicating with the tip side of the plug introduction hole 12 and having a diameter larger than the plug introduction hole 12, a locking ring 14 fixed in the enlarged diameter hole 13, a slider 15 having a slide ring 151 disposed movably in the axial direction and the axial radial direction, and an energizing elastic member 16 for energizing the slide ring 151 toward the locking ring 14. The plug body 6 is coupled to the slider 15, and the plug body 6 is held in the plug insertion part 9 movably in the axial direction and the axial radial direction.

The plug introduction hole 12 includes an introduction port 121 opened to the side where the plug 7 is introduced and an insertion part 122 having a diameter smaller than the introduction port 121, the insertion part 122 is continuous with the introduction port 121 via a taper 123, and the plug 7 inserted from the introduction port 121 is guided to the insertion part 122 by the taper 123.

The insertion part 122 is formed to be larger than the outer diameter of the plug 7, and the plug 7 can move in the axial radial direction in the state of being inserted in the insertion part 122.

The slider 15 is integrally formed of a conductive metal material and includes the annular slide ring 151 and a cylindrical holder part 152 with the base end supported by the slide ring 151, and the slide ring 151 is disposed between the bottom of the enlarged diameter hole 13 on the plug introduction hole 12 side and the locking ring 14 to be movable in the axial direction and the axial radial direction and can thus float with respect to the case 2.

The holder part 152 includes a cylindrical holder ring 153 and a plurality of engagement spring bodies 154, 154 with the base ends supported by the lower end side of the holder ring 153, and the upper end of the holder ring 153 is supported by the slide ring 151.

The engagement spring bodies 154,154 are disposed at intervals in the circumferential direction, extend obliquely inward so that the tip sides are closer to each other than the holder ring 153, and have a tapered cylindrical shape in which the tip sides are narrowed by the plurality of engagement spring bodies 154,154.

The plug body 6 is inserted into a predetermined position while pushing and expanding the engagement spring bodies 154, 154 through the holder ring 153, and each of the engagement spring bodies 154, 154 elastically returns to engage with an engagement protrusion 234 projected on the outer peripheral surface of the plug body 6.

At this time, by a series of operations in which the engagement spring bodies 154, 154 are elastically restored after being pushed and expanded, a click feeling is obtained, which makes it possible to confirm that the plug body 6 is steadily coupled to the slider 15 and to confirm the connection with the receptacle 8.

The energizing elastic member 16 is formed in a ring shape using an elastic conductive metal member such as brass and has one end supported by the surface and the other end supported by plate springs 161, 161 . . . rising in the plate thickness direction.

The locking ring 14 is formed using a conductive metal material in a cylindrical shape having an inner diameter larger than the outer diameter of the holder ring 153 and is press-fitted from the inner side of the case 2 of the enlarged diameter hole 13.

In the enlarged diameter hole 13, a step 131 is formed at a position separated by a predetermined width from the bottom on the plug introduction hole 12 side, and by abutting the locking ring 14 against the step 131, a gap is formed between the bottom of the enlarged diameter hole 13 on the plug introduction hole 12 side and the end portion of the locking ring 14

In this gap, the slide ring 151 is disposed in a state movable in the axial direction and the axial radial direction, and the slide ring 151 is energized toward the locking ring 14 by the energizing elastic member 16.

Figure 6:
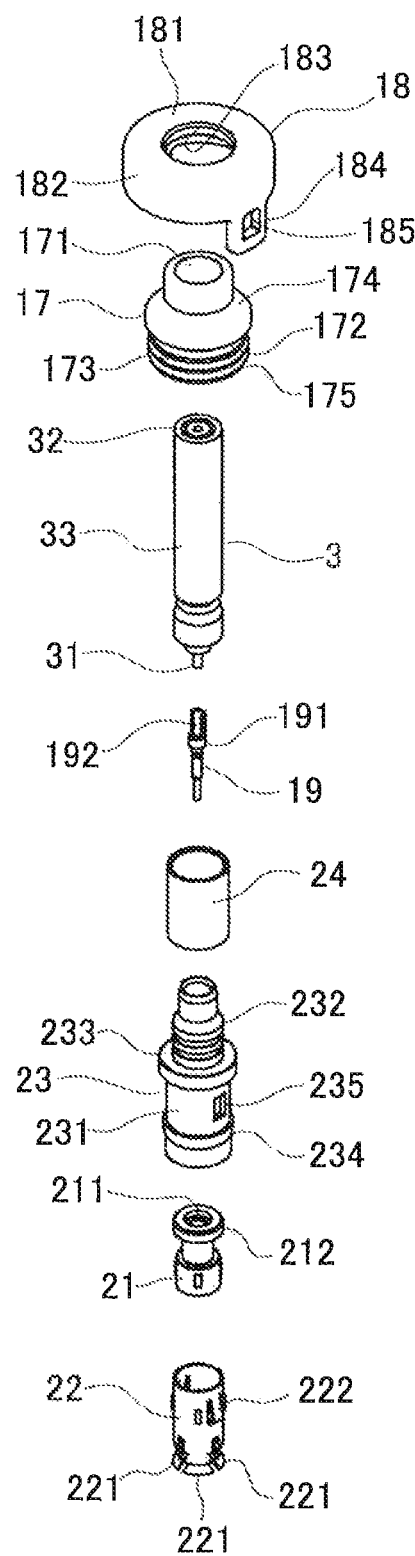
FIG. 6 is an exploded perspective view illustrating a plug in FIG. 2.

As illustrated in FIG. 6, the plug 7 includes the plug body 6 to which the coaxial cable 3 is connected, a cap 17 fitted to the outside of the coaxial cable 3, and a cover body 18 for fixing the cap 17 to the plug insertion part 9.

Figure 7:
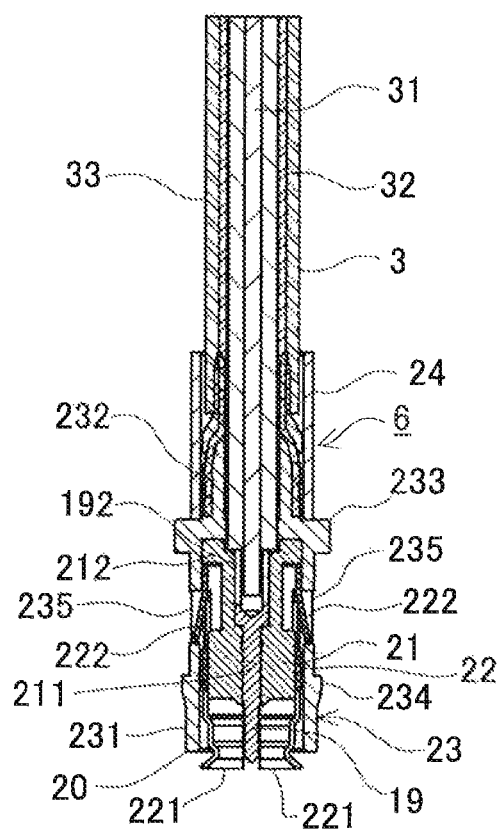
FIG. 7 is an enlarged longitudinal sectional view illustrating a plug body in the same structure.

As illustrated in FIG. 7, the plug body 6 includes a pin-shaped central contact 19 to which a center conductor 31 of the coaxial cable 3 is connected, a cylindrical shell 20 disposed outside the central contact 19, and an insulator 21 interposed between the central contact 19 and the shell 20, and the insulator 21 incorporating the contact is housed in the shell 20.

The shell 20 includes a cylindrical external contact 22, an external shell 23 to which the external contact 22 is fitted at the tip side, and a connection sleeve 24 to which the external contact 23 is fitted at the rear end side, and an external conductor 32 of the coaxial cable 3 is sandwiched between the external shell 23 and the connection sleeve 24.

The external shell 23 is integrally cast with a conductive metal and includes a bottomed cylindrical external shell body 231 with one end open and a cylindrical conductor connection part 232 projected on the other end side of the external shell body 231.

The external shell body 231 has a flange-shaped flange part 233 at one end and is inserted into the slider 15 from the opening side.

Further, on the outer peripheral part of the external shell body 231, the flange-shaped engagement protrusion 234 is provided on the opening side of the outer peripheral surface, and engagement holes 235, 235 are formed on the flange side of the engagement protrusion 234 at an interval in the circumferential direction.

The external shell body 231 is inserted into the slider 15 by inserting the plug body 6 into the plug insertion part 9, the flange part 233 is fitted into a step formed on the inner peripheral slide ring 151 side of the holder ring 153, and when the engagement protrusion 234 is inserted into a predetermined position while pushing and expanding the engagement spring bodies 154, 154 through the holder ring 153, each of the engagement spring bodies 154, 154 is engaged with the engagement protrusion 234, and the plug body 6 is connected to the slider 15.

The conductor connection part 232 is formed in a cylindrical shape having a tapered tip side and is projected so as to communicate with the external shell body 231.

In the conductor connection part 232, the external conductor 32 exposed by peeling a coat 33 is crept outward, and the connection sleeve 24 is fitted from the outside, whereby the external conductor 32 is fixed between the conductor connection part 232 and the connection sleeve 24, and the external conductor 32 and the shell 20 are conducted.

The external contact 22 is integrally formed of an elastic conductive metal material and is formed in a cylindrical shape with both axial ends open.

The external contact 22 is formed to have an outer diameter smaller than the inner diameter of the external shell 23 and includes a plurality of cantilevered spring-like elastic contact pieces 221, 221 . . . separated at intervals in the circumferential direction by a plurality of slits having open ends on the connector connection side.

Note that the outer diameter of the external contact 22 is smaller than the inner diameter of the external shell body 231, and each of the elastic contact pieces 221, 221 . . . can swing within the external shell 23.

Further, the external contact 22 has an elastic engagement protruding pieces 222, 222 formed on the outer peripheral surface by cutting and raising, the insulator 21 and the external contact 22 are inserted into the external shell 23 from the opening, and the elastic engagement protruding pieces 222, 222 are engaged with the engagement holes 235, 235, whereby the insulator 21 and the external contact 22 are fixed in the external shell 23.

The central contact 19 is formed of a conductive metal such as brass in a pin shape having an enlarged diameter part 191 on the rear end side, and the center conductor 31 of the coaxial cable 3 is inserted into a conductor insertion hole 192 opened on the rear end side and fixed in a conductive state by solder or the like.

The insulator 21 is formed of an insulating resin in a cylindrical shape, and through its center, a contact insertion hole 211, into which the central contact 19 is inserted, penetrates.

The insulator 21 has a flange 212 on the rear end side, and when the insulator 21 and the external contact 22 are housed into the external shell body 231, the flange 212 is pressed by the external contact 22 to be prevented from coming off.

Note that the insulator 21 is formed shorter than the external contact 22, space into which the receptacle 8 penetrates is formed inside the elastic contact pieces 221, 221 . . . , and the tip side of the central contact 19 inserted into the contact insertion hole 211 protrudes into the space from the tip side of the insulator 21.

Figure 8:
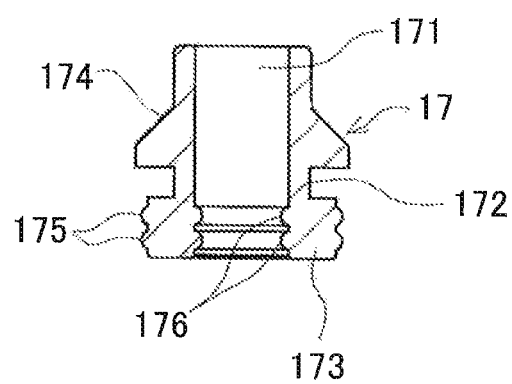
FIG. 8 is an enlarged longitudinal sectional view illustrating a cap in the same structure.

As illustrated in FIG. 8, the cap 17 is formed of an elastic body such as silicone in a cylindrical shape, having at the center a cable insertion hole 171 through which the coaxial cable 3 is penetrated.

In the cap 17, a cover body coupling groove 172, which is continuous in the circumferential direction, is formed on the outer periphery, and a press-fitting part 173, which is press-fitted into the plug insertion part 9 via the cover body coupling groove 172, and a truncated cone-shaped pushing part 174 are disposed.

The press-fitting part 173 is formed in a cylindrical shape, a plurality of circumferentially continuous packing-like sealing protrusions 175, 175 is integrally projected on the outer peripheral part, and the plug insertion part 9 is sealed by press-fitting the sealing protrusions 175, 175 into the plug insertion part 9 in a pressed state, and the plug body 6 is held by the cap 17 via the coaxial cable 3.

The cable insertion hole 171 includes packing-like sealing members 176, 176 on the inner peripheral surface and is gripped in a sealed state between the cap 17 and the coaxial cable 3.

Figure 9:
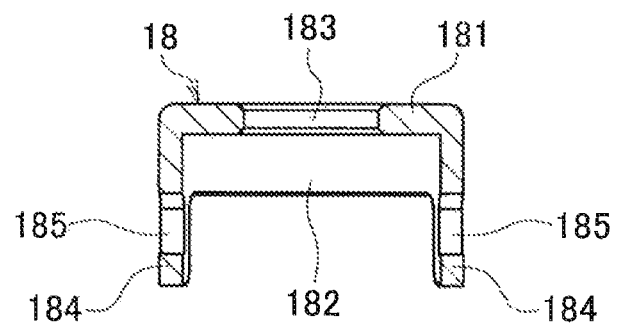
FIG. 9 is an enlarged longitudinal sectional view illustrating a cover body in the same structure.

As illustrated in FIG. 9, the cover body 18 is formed of an elastic resin material such as silicone in a closed-top cylindrical shape having a disk-like top plate part 181 and a cylindrical outer peripheral part 182 supported by the top plate part 181.

The top plate part 181 includes a fitting hole 183 having the same diameter as the cover body coupling groove 172 at the center, the cap 17 is caused to pass through the fitting hole 183, the top plate part 181 is fitted to the cover body coupling groove 172, and the top plate part 181 is held in the state of overhanging to the outside of the cap 17.

The outer peripheral part 182 is formed in a cylindrical shape having an inner diameter equal to the outer diameter of the plug insertion part 9 and is fitted to the outside of the plug insertion part 9.

A plurality of fixing pieces 184, 184 is integrally projected from the lower end of the outer peripheral part 183 at intervals in the circumferential direction, and an engagement hole 185 for engaging with each of engagement projections 91, 91 projected from the outer periphery of the plug insertion part 9 is formed in the fixing piece 184.

In the plug insertion part 9, a portion where the cover body 18 is fitted and a portion where the fixing piece 184 is positioned are made thinner than the other portions, so that the plug insertion part 9 can be positioned by fitting the cover body 18 in accordance with the shape of the thin portion.

Figure 10:
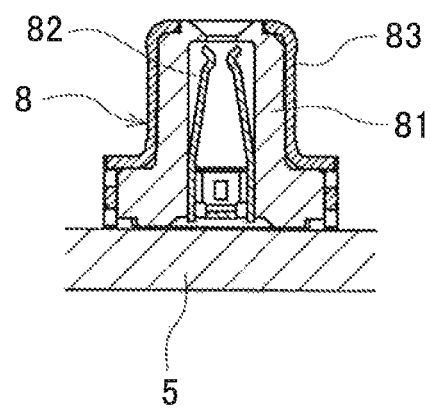
FIG. 10 is an enlarged longitudinal sectional view illustrating a receptacle in the same structure.

As illustrated in FIG. 10, the receptacle 8 includes a cylindrical housing 81 made of insulating resin, a receptacle-side central contact 82 housed in the housing 81, and a receptacle-side external contact 83 made of a conductive metal material covering the outer surface of the housing 81, the receptacle-side central contact 82 is connected to a predetermined circuit of the substrate 5, and the receptacle-side external contact 83 is in ground (GND) connection to the substrate 5.

In the floating structure of the coaxial connector 4 thus configured, when the plug body 6 is inserted to a predetermined depth of the plug insertion part 9, the plug body 6 is inserted into the slider 15, the tip portion of the central contact 19 is inserted into the housing 81 of the receptacle 8, and the end portion of the external contact 22, that is, each of the elastic contact pieces 221, 221 . . . contacts the outside of the receptacle-side external contact 83.

Figure 11:
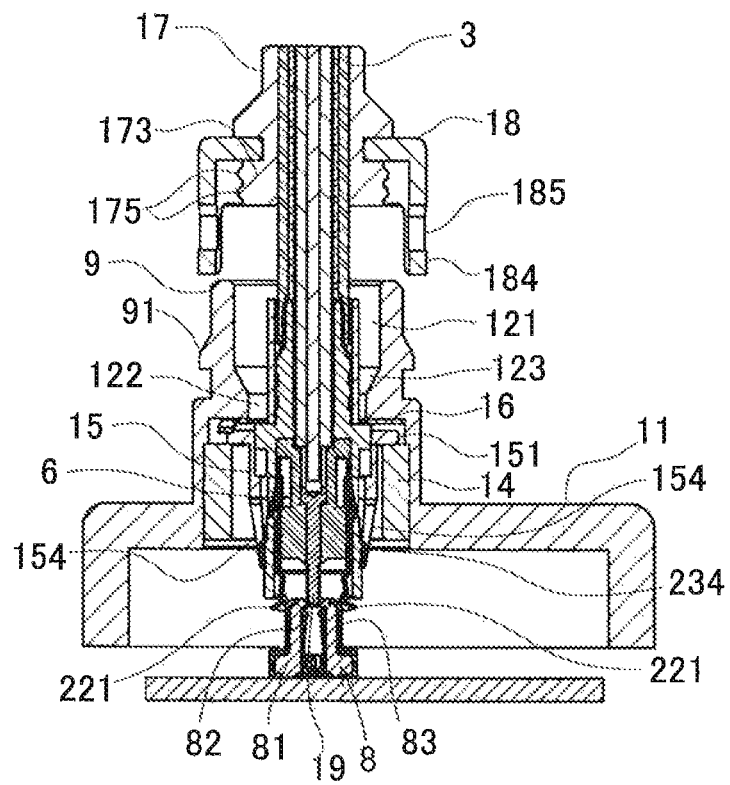
FIG. 11 is a longitudinal sectional view illustrating a connection operation when displacement has occurred in the same floating structure of the coaxial connector.

At this time, as illustrated in FIG. 11, when the position of the receptacle 8 in the case 2 is displaced in the axial radial direction, the slider 15 moves in the axial radial direction of the coaxial cable 3, the plug body 6 moves in the axial radial direction in accordance with the position of the receptacle 8, and the plug 7 and the receptacle 8 are aligned with each other.

Figure 12:
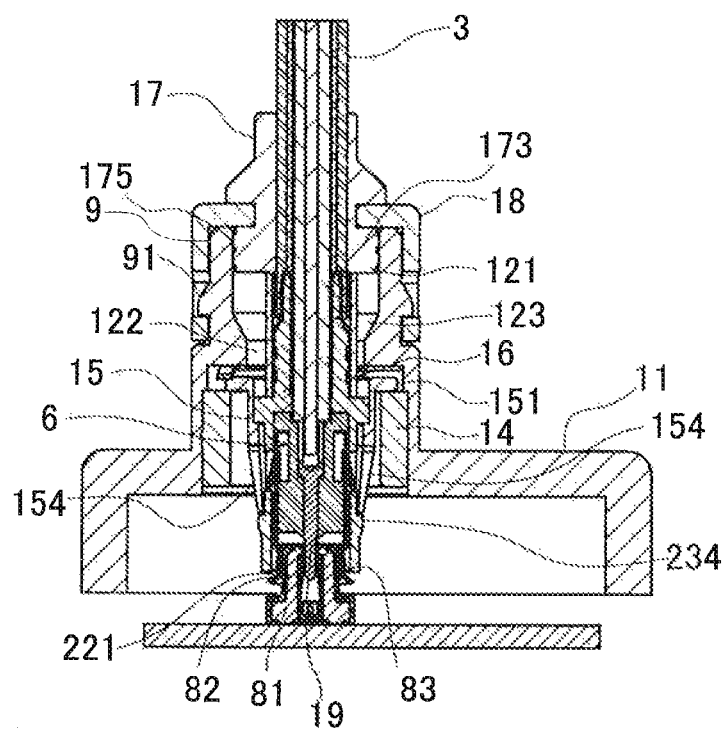
FIG. 12 is a longitudinal sectional view illustrating the connected state in the same structure.

When the plug body 6 is further pushed into the receptacle 8 side, and the cap 17 and the cover body 18 are fitted into the plug insertion part 9, as illustrated in FIG. 12, the plug body 6 is pushed in by the cap 17, the flange part is fitted into the step formed on the inner peripheral slide ring 151 side of the holder ring 153, the engagement protrusion 234 is inserted into a predetermined position while pushing and expanding the engagement spring bodies 154, 154 through the holder ring 153, each of the engagement spring bodies 154, 154 is engaged with the engagement protrusion 234, and the plug body 6 is connected to the slider 15.

At this time, the cap 17 is prevented from coming off by the cover body 18, a click feeling is obtained when the engagement spring bodies 154, 154 is elastically restored and engaged with the engagement protrusion 234, and even when the case 2 is interposed, and the connection state cannot be visually recognized, a reliable connection can be confirmed.

Further, in this floating structure, since the cap 17 closes the opening of the plug insertion part 9, and the plug 7 is held by the cap 17 via the coaxial cable 3, the water cutoff property can be ensured even when there is a gap between the plug body 6 and the insertion hole of the plug 7, and the position of the plug 7 after being connected by floating can be maintained stably.

In the above embodiment, the example of separately forming the cap 17 and the cover body 18 has been described, but the cap 17 and the cover body 18 may be formed integrally.

REFERENCE SIGNS LIST

1 Module
2 Case
3 Coaxial cable
31 Center conductor
32 External conductor
33 Coat
4 Coaxial connector
5 Substrate
6 Plug body
7 Plug
8 Receptacle
81 Housing
82 Receptacle-side central contact
83 Receptacle-side external contact
9 Plug insertion part
91 Engagement projection
10 Front case
11 Rear case
111 Peripheral wall
112 Top plate part
12 Plug introduction hole
121 Introduction port
122 Insertion part
123 Taper
121 Introduction port
122 Insertion part
123 Taper
13 Enlarged diameter hole
131 Step
14 Locking ring
15 Slider
151 Slide ring
152 Holder part
153 Holder ring
154 Engagement spring body
16 Energizing elastic member
161 Plate spring
17 Cap
171 Cable insertion hole
172 Cover body coupling groove
173 Press-fitting part
174 Pushing part
175 Sealing protrusion
18 Cover body
181 Top plate part
182 Outer peripheral part 183 Fitting hole
184 Fixing piece
185 Engagement hole
19 Central contact
191 Enlarged diameter part
192 Conductor insertion hole
20 Shell
21 Insulator
211 Contact insertion hole
212 Flange
22 External contact
221 Elastic contact piece
222 Elastic engagement protruding piece
23 External shell
231 External shell body
232 Conductor connection part
233 Flange part
234 Engagement protrusion
235 Engagement hole
24 Connection sleeve

The invention claimed is:

1. A floating structure of a coaxial connector comprising:
a plug having a plug body connected with a flexible coaxial cable; and
a receptacle housed in a case,
the plug, inserted into a cylindrical plug insertion part formed in the case, and the receptacle being coupled to each other,
wherein
the plug insertion part is formed with a plug introduction hole having an inner diameter larger than an outer diameter of the plug, and
an enlarged diameter hole communicating with a tip side of the plug introduction hole and having a diameter larger than a diameter of the plug introduction hole,
the plug insertion part includes
a locking ring fixed in the enlarged diameter hole,
a slider having a slide ring disposed movably in an axial direction and an axial radial direction between a bottom of the enlarged diameter hole and the locking ring, and
an energizing elastic member that energizes the slide ring toward the locking ring,
the plug body is coupled to the slider, and
the plug body is held in the plug insertion part movably in the axial direction and the axial radial direction,
wherein
the slider includes a holder part into which the plug body is inserted, and
an engagement spring body that engages with an engagement protrusion projected from an outer periphery of the plug body is provided on a tip side of the holder part.

2. The floating structure of the coaxial connector according to claim 1, wherein
the plug includes a cap made of an elastic body that fits outside the coaxial cable and fits into an introduction-side opening of the plug insertion part, and
the cap seals the plug insertion part, and the plug body is held on the cap via the coaxial cable.

3. The floating structure of the coaxial connector according to claim 2, further comprising
a cover body having a top plate part projected outward from the cap and a cylindrical outer peripheral part supported by the top plate part,
the outer peripheral part is formed with an engagement hole that engages with an engagement projection projected from an outer periphery of the plug insertion part.

* * * * *